United States Patent
Bonin et al.

(10) Patent No.: US 6,943,980 B2
(45) Date of Patent: Sep. 13, 2005

(54) ELECTROSTATIC TRACK FOLLOWING USING PATTERNED MEDIA

(75) Inventors: Wayne A. Bonin, North Oaks, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 526 days.

(21) Appl. No.: 10/055,456

(22) Filed: Jan. 23, 2002

(65) Prior Publication Data

US 2002/0154440 A1 Oct. 24, 2002

Related U.S. Application Data

(60) Provisional application No. 60/267,305, filed on Feb. 8, 2001.

(51) Int. Cl.⁷ .............................................. G11B 5/596
(52) U.S. Cl. ................................................. 360/78.04
(58) Field of Search ........................... 360/75, 245.7, 360/78.04

(56) References Cited

U.S. PATENT DOCUMENTS

| | | | |
|---|---|---|---|
| 4,997,521 A | 3/1991 | Howe et al. ................. 156/651 |
| 5,488,519 A * | 1/1996 | Ishida et al. .............. 360/77.03 |
| 5,729,026 A | 3/1998 | Mamin et al. ............ 250/492.2 |
| 5,839,193 A | 11/1998 | Bennin et al. .............. 29/896.9 |
| 5,844,751 A | 12/1998 | Bennin et al. .............. 360/104 |
| 5,856,672 A | 1/1999 | Ried ......................... 250/306 |
| 5,856,896 A | 1/1999 | Berg et al. .................. 360/104 |
| 5,864,445 A | 1/1999 | Bennin et al. .............. 360/104 |
| 5,943,189 A | 8/1999 | Boutaghou et al. ......... 360/103 |
| 5,991,114 A | 11/1999 | Huang et al. .................. 360/75 |
| 5,999,303 A | 12/1999 | Drake ........................ 359/224 |
| 6,005,736 A | 12/1999 | Schreck | |
| 6,044,056 A | 3/2000 | Wilde et al. ................ 369/119 |

OTHER PUBLICATIONS

Lin, C. and Massaro, D. J., IBM Technical Disclosure Bulletin, Electrostatically Loaded Slider Bearing, vol. 12, No. 7, Dec. 1969.

* cited by examiner

Primary Examiner—David Hudspeth
Assistant Examiner—Mitchell Slavitt
(74) Attorney, Agent, or Firm—Kinney & Lange, P.A.

(57) ABSTRACT

A transducing head positioning system for use with patterned media. The patterned media comprises a plurality of data tracks and grooves. The grooved tracks can be used in connection with electrodes on a slider to create an electrostatic motor for microactuation of the slider.

31 Claims, 6 Drawing Sheets

Curvature depth in microinches
Change in curvature with respect to 28mm radius

| y (mm) | 16 | | 20 | | 24 | | R (mm) 28 | | 32 | | 36 | | 40 | | 44 | |
|---|---|---|---|---|---|---|---|---|---|---|---|---|---|---|---|---|
| 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| 0.010 | 0.123 | 0.053 | 0.098 | 0.028 | 0.082 | 0.012 | 0.070 | 0.000 | 0.062 | -0.009 | 0.055 | -0.016 | 0.049 | -0.021 | 0.045 | -0.026 |
| 0.020 | 0.492 | 0.211 | 0.394 | 0.112 | 0.328 | 0.047 | 0.281 | 0.000 | 0.246 | -0.035 | 0.219 | -0.062 | 0.197 | -0.084 | 0.179 | -0.102 |
| 0.030 | 1.107 | 0.475 | 0.886 | 0.253 | 0.738 | 0.105 | 0.633 | 0.000 | 0.554 | -0.079 | 0.492 | -0.141 | 0.443 | -0.190 | 0.403 | -0.230 |
| 0.040 | 1.969 | 0.844 | 1.575 | 0.450 | 1.312 | 0.187 | 1.125 | 0.000 | 0.984 | -0.141 | 0.875 | -0.250 | 0.787 | -0.337 | 0.716 | -0.409 |
| 0.050 | 3.076 | 1.318 | 2.461 | 0.703 | 2.051 | 0.293 | 1.758 | 0.000 | 1.538 | -0.220 | 1.367 | -0.391 | 1.230 | -0.527 | 1.118 | -0.639 |
| 0.060 | 4.429 | 1.898 | 3.543 | 1.012 | 2.953 | 0.422 | 2.531 | 0.000 | 2.215 | -0.316 | 1.969 | -0.562 | 1.772 | -0.759 | 1.611 | -0.920 |
| 0.070 | 6.029 | 2.584 | 4.823 | 1.378 | 4.019 | 0.574 | 3.445 | 0.000 | 3.014 | -0.431 | 2.679 | -0.766 | 2.411 | -1.033 | 2.192 | -1.253 |
| 0.080 | 7.874 | 3.375 | 6.299 | 1.800 | 5.249 | 0.750 | 4.499 | 0.000 | 3.937 | -0.562 | 3.500 | -1.000 | 3.150 | -1.350 | 2.863 | -1.636 |
| 0.090 | 9.966 | 4.271 | 7.972 | 2.278 | 6.644 | 0.949 | 5.695 | 0.000 | 4.983 | -0.712 | 4.429 | -1.265 | 3.986 | -1.708 | 3.624 | -2.071 |
| 0.100 | 12.303 | 5.273 | 9.843 | 2.812 | 8.202 | 1.172 | 7.030 | 0.000 | 6.152 | -0.879 | 5.468 | -1.562 | 4.921 | -2.109 | 4.474 | -2.557 |

FIG. 5

ELECTROSTATIC TRACK FOLLOWING USING PATTERNED MEDIA

CROSS-REFERENCE TO RELATED APPLICATION(S)

This application claims priority from provisional application Ser. No. 60/267,305, filed on Feb. 8, 2001, and entitled "Electrostatic Track Following using Patterned Media" by Wayne Allen Bonin and Zine-Eddine Boutaghuo, which is herein incorporated by reference.

BACKGROUND OF THE INVENTION

The present invention relates to a disc drive system. In particular, the present invention relates to a head positioning system capable of accommodating ever higher areal density of computer discs.

Disc drive systems are well known in the art and comprise several discs, each disc having concentric data tracks for storing data. The discs are mounted on a spindle motor, which causes the discs to spin. As the discs are spinning, a slider suspended from an actuator arm "flies" a small distance above the disc surface. The slider carries a transducing head for reading from or writing to a data track on the disc.

In addition to the actuator arm, the slider suspension comprises a bearing about which the actuator arm pivots. A large scale actuator motor, such as a voice coil motor (VCM), is used to move the actuator arm over the surface of the disc. When actuated by the VCM, the slider can be moved from an inner diameter to an outer diameter of the disc along an arc until the slider is positioned above a desired data track on the disc. Called tracking, this method of positioning the slider above the desired track on the disc allows the transducing head on the slider to either read from or write data to a selected track on the disc.

The areal recording density of the disc is typically given in tracks per inch (TPI). There is constant pressure to increase the areal density of discs, and thus increase the number of tracks per inch on the disc. As the tracks per inch increase, the accuracy of the system used to position the transducing head above the desired track on the disc must increase in proportion. This requires increasing the bandwidth of the servo system used to position the actuator arm.

There are many sources of error which reduce the track positioning accuracy of current slider suspension systems. The actuator arm is designed to be flexible to improve the ability of the slider to more closely follow the surface of the disc. However, this flexibility can result in the occurrence of unwanted resonances in the suspension as the suspension is moved across the disc surface during tracking. These unwanted resonances in the suspension reduce the ability to accurately control the slider positioning system at the required frequency. In addition, forces acting at the VCM, the bearing, and the actuator arm may all introduce potential error into the final tracking ability of the slider by adding to the resonance experienced in the actuator arm.

In an attempt to manage the amount of resonance in the suspension, secondary microactuators have been placed between the suspension and the slider. Moving the slider directly by using a form of microactuator has reduced, but has not eliminated the effect of suspension resonances. In particular, as the actuation force is applied to the slider by the microactuator, an equal and opposite reaction force is applied to the suspension, which in turn can create other resonance disturbances in the suspension. Control systems have been developed which attempt to compensate for the resonance and vibration experienced by the slider. However, such attempts reduce, but do not eliminate the effect of suspension resonances.

Microactuators and control systems have improved the tracking accuracy of sliders to where areal densities of up to 200,000 TPI may be possible. However, current goals are for discs having areal densities of as high as 500,000 to 1,000,000 TPI. At such areal densities, current slider positioning methods become inadequate.

Thus, there is a need in the art for an improved head positioning system which is capable of accommodating discs with ever higher areal densities.

BRIEF SUMMARY OF THE INVENTION

The present invention relates to a head positioning system capable of positioning a slider over a medium having up to 500,000 to 1,000,000 TPI. The head positioning system comprises a slider positioned over a patterned media. The patterned media comprises a disc having a plurality of tracks and grooves. Located on the slider's medium opposing surface are a plurality of electrodes. The electrodes can be selectively activated so that together with the tracks on the disc, the electrodes operate as an electrostatic motor. Using the electrostatic motor, the slider can be finely positioned at a desired track on the disc.

BRIEF DESCRIPTION OF THE DRAWINGS

FIG. 5 is a table illustrating the curvature depth in microinches and the change in curvature with respect to a 28 millimeter radius.

DETAILED DESCRIPTION

Figure 1:
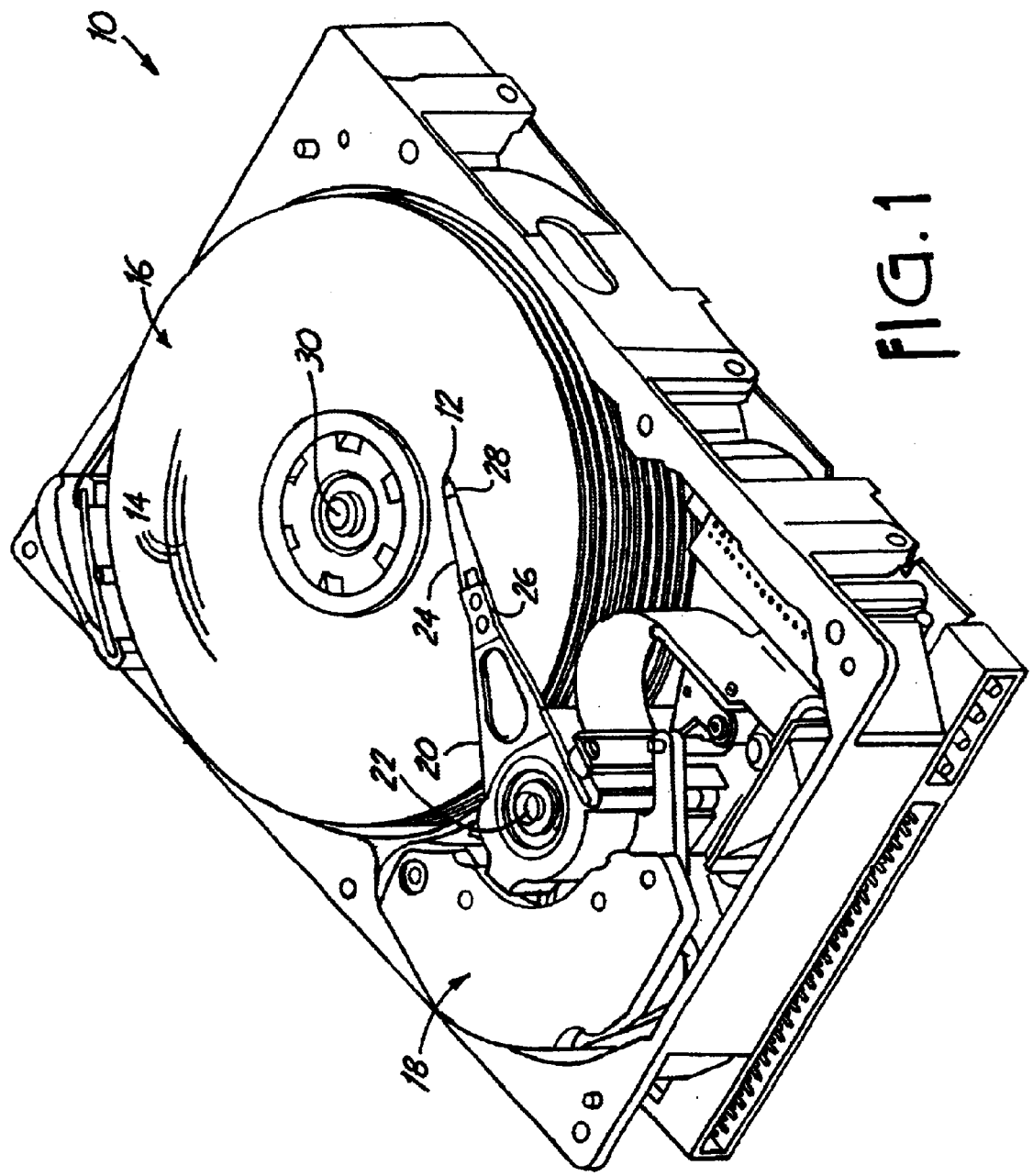
FIG. 1 is a perspective view of a disc drive actuation system for positioning a slider over a track on a disc.

FIG. 1 is a perspective view of a disc drive actuation system 10 for positioning a slider 12 over a selected data track 14 of a magnetic storage medium 16, such as a disc. The actuation system 10 includes a voice coil motor (VCM) 18 arranged to rotate a slider suspension 20 about an axis 22. The slider suspension 20 includes a load beam 24 connected to an actuator arm 26 at a slider mounting block. A flexure 28 is connected to the end of the load beam 24, and carries the slider 12. The slider 12 carries a magneto-resistive (MR) element (not shown) for reading and/or writing data on the concentric tracks 14 of the disc 16.

The disc 16 rotates around an axis 30, which causes the slider 12 to "fly" a small distance above the surface of the disc 16. To position the slider 12 at a desired track 14 on the disc 16, the VCM 18 actuates the slider suspension 20 about the axis 22 so that the suspension 20 is moved in an arc across the surface of the disc 16. This arc shaped movement allows the slider 12 to be moved from an inner diameter to an outer diameter of the disc 16 so that the slider can be positioned above the desired track 14 on the disc 16. A variety of sources of positioning error are introduced during this process and while the disc drive 10 is capable of operation at up to 200,000 TPI, it is inadequate for TPI's in excess of that number.

Figure 2:
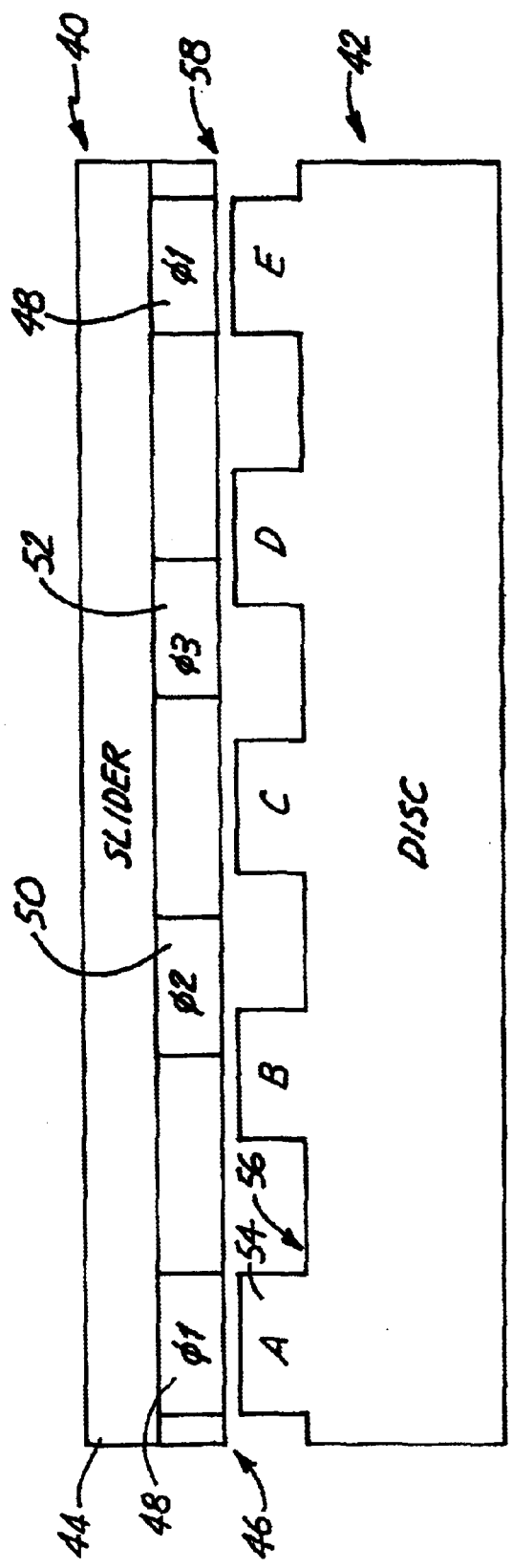
FIG. 2 is an greatly enlarged side view of a slider having a plurality of electrodes positioned above a grooved media.

The present invention improves upon the disc drive illustrated in FIG. 1 to allow for TPI of up to 500,000 to 1,000,000 TPI. FIG. 2 is a greatly enlarged side view of a slider 40 positioned above a patterned medium 42, such as a disc. The slider 40 comprises a slider substrate 44 and a disc opposing surface 46. On the disc opposing surface 46 are a plurality of phase 1 electrodes 48, phase 2 electrodes 50, and phase 3 electrodes 52.

The patterned media 42 comprises a disc having a plurality of tracks 54, labeled A-E, and grooves 56. It is anticipated that such a patterned media, in the form of tracks 54 and grooves 56, will be necessary in order to increase the bit density possible before the onset of the superparamagnetic limit, which currently sets a lower size limit on the magnetic particle size of the storage media.

The tracks 54 on the disc 42 can be used in conjunction with the phase 1, 2, and 3 electrodes 48–52 to form an electrostatic motor 58 for microactuation of the slider 40. An application of a voltage to a phase 1, 2, or 3 electrode 48–52, causes an electrostatic attraction between the activated electrode 48–52 and the closest track 54 on the disc 42 over which the activated electrode 48–52 is located. By controlling the application of voltage to selected phase 1, 2, or 3 electrodes 48–52, it is possible to finely position the slider 40 above a selected location on the disc 42.

When moving the slider 40 using the electrostatic motor 58, an electrostatic force is generated between the disc 42 and the slider 40. As a result, unlike using a microactuator between the slider and the suspension to move the slider, there is no reactive force acting on the suspension when using the electrostatic motor. This reduces the negative effects of suspension resonances on the tracking ability of the slider 40.

One method of operating the electrostatic motor 58 is to apply a voltage to only one set of either the phase 1, phase 2, or phase 3 electrodes 48–52 at any given time. The set of electrodes 48–52 is activated by applying an electrical potential to the selected electrodes 48–52 while the other electrodes 48–52 remain at ground potential, as does the disc 42. More specifically, activating the phase 1 electrodes 48 will cause the phase 1 electrodes 48 to center over the closest data track 54 on the disc 42, or tracks A and E as shown in FIG. 2. Activating the phase 2 electrodes 52 and deactivating the phase 1 electrodes 50 will cause the slider 40 to move ⅓ of a track 56 to the left (as viewed in FIG. 2) so that the phase 2 electrode 50 is centered over track B. Similarly, activating the phase 3 electrodes 52 and deactivating the phase 1 electrodes 48 will cause the slider 40 to move ⅓ of a track 54 to the right, so that the phase 3 electrode 52 is centered over data track D. Thus, by properly sequencing the application of voltage to phase 1, phase 2, and phase 3 electrodes 48–52, it is possible to move the slider 40 any desired distance across the disc surface 42.

A control system can be used to control the tracking of the slider 40 by controlling the application of voltage to the electrodes 48–52. Such a control system can be used to cause the slider 40 to lock onto a desired track 54 by selectively activating the electrodes 48–52. In doing so, the control system causes the electrostatic motor 58 to act similar to a stepper motor. As a result, the control system allows for automatic track following without a closed loop servo feedback system.

For instance, a positioning resolution of ⅙ of a track can be obtained by first activating the phase 1 electrodes 48, centering the phase 1 electrodes over tracks A and E. Next, both phase 1 electrodes 48 and phase 3 electrodes 52 are activated, causing the slider to move slightly so that the phase 1 electrodes 48 are no longer centered over tracks A and E, but are shifting slightly to the right (as viewed in FIG. 2). Finally, activating the phase 3 electrodes 52 but not the phase 1 electrodes 48 results in the slider moving to the right (as viewed in FIG. 2) until the phase 3 electrode 52 is centered over track D. As a result of this sequence of activation, the slider is moved ⅓ track to the right. Thus, continuos analog positioning can be obtained by adjusting the voltages applied to the electrodes 48–52 in a continuous analog manner, rather than by simple digital switching.

The patterned media 42 may have various ratios of tracks 54 to grooves 56. For instance, as is illustrated in FIG. 2, the width of the tracks 54 may be equal to the width of the grooves 56. Other ratios may be suitable for use with the present invention as well, including a track width to groove width ratio of 60/40. Similarly, the spacing of the electrodes 48–52 on the slider 40 may vary based on the track 54 spacing on the disc 42. In FIG. 2, the spacing of the electrodes 48–52 on the slider 40 is ⅘ of the track 54 to track 54 spacing on the disc 42.

Regardless of the spacing of the tracks 54, it is desirable that the width of the electrodes 48–52 on the slider 40 be about equal to the width of the tracks 54 on the disc 42. If the electrodes 48–52 are wider than the tracks 54, the ability of the electrodes 48–52 to follow the tracks 54 is diminished. If the electrodes 48–52 are narrower than the tracks 54, the electrodes 48–52 may wander the width of the tracks 54, reducing the performance and accuracy of the tracking ability of the slider 40.

The maximum force available for moving or holding the slider 40 with respect to the tracks 54 on the disc 42 depends on several factors, including: the number and length of active electrodes 48–52; the gap between the slider 40 and the disc 42; and the voltage applied to the active electrodes 48–52. The relationship of these factors is given in the below equation:

$$F_{lat} = N \frac{\varepsilon_o L}{2d} V^2$$

Where $F_{lat}$ is the lateral force in newtons, N is the number of active electrodes, d is the gap between the disc and slider electrodes in meters, $\varepsilon_o$, is the dielectric constant of the gap ($8.854 \times 10^{-12}$ F/m for air or a vacuum), L is the length of the active electrodes in meters, and V is the voltage between the active slider electrodes and the disc.

When an active electrode 48–52 is positioned directly above a track 54, the alignment force is essentially zero. Once the slider starts moving off a track, the lateral force begins to increase. The maximum lateral force occurs when the active electrode is misaligned from a track by about the fly height, or gap. The lateral force stays essentially at the maximum until the active electrode 48–52 moves further away from a track 54 than the fly height.

As is shown in the above equation, the lateral positioning force varies with the square of the voltage between the slider electrodes 48–52 and the disc 42. The amount of voltage that can be applied to the slider electrodes 48–52 is limited by a variety of factors. At a gap of 0.1 microinches (about 2.5 nanometers), the voltage limit is not due to the electrical breakdown strength of air, which actually increases for air at standard pressure for a spacing of less than about 7 micrometers. Rather, at gaps of less than about 1 nanometer, electron tunneling currents are likely to be the limiting factor.

At gaps of 2.5 nanometers, the voltage limit will likely be due to field emission. The electric field at which significant field emission occurs varies greatly depending on the material used for the electrodes 48–52. The table below gives the magnetic field strength at which significant field emission occurs for a variety of materials:

| Material | Electric Field (in Volts per meter) |
|---|---|
| Tungsten | $1.4 \times 10^{10}$ |
| Lanthanum hexaboride | $3.7 \times 10^{9}$ |
| specially prepared metal/insulator system using Beryllia particles | $5 \times 10^{8}$ |
| p-doped diamond material | 15 to $30 \times 10^{7}$ |

Using the above values for maximum electric field strength, the maximum possible voltage for a gap of 2.5 nanometers would be 35 volts for Tungsten, 9.25 volts for Lanthanum hexaboride, 1.25 volts for the Beryllia particle metal/insulator system, and 0.175 for the p-doped diamond material.

Another limiting factor for electrode voltage is the normal attraction force between the disc and the slider electrodes. The normal force is given in the below equation:

$$F_n = N \frac{\varepsilon_o L w}{2d^2} V^2$$

where w is the width of the slider electrodes and all the variables are the same as those previously defined above.

The normal force ($F_n$) is equal to the lateral force ($F_{lat}$) multiplied by w/d. Thus, for slider electrodes having a width of 25 nanometers and a gap of 2.5 nanometers, the normal force is 10 times larger than the lateral positioning force. Typically, the total pre-load force supported by the air bearing in current slider designs is about 2.5 grams. As such, the electrostatic attraction force needs to be limited to about 1 gram unless a drastic redesign of the air bearing is performed because of the risk that the normal force will overcome the pre-load force such that the slider crashes into the disc.

In addition to the amount of voltage applied to the electrodes, the lateral positioning force available for moving or holding the slider 40 depends on the length of the electrodes on the slider. The patterned storage medium is typically a disc having concentric data tracks on its surface. The curvature of the concentric data tracks on the disc limits the length of the electrodes on the slider. This is because the radius of the data tracks at the inner diameter of the disc will be smaller than the radius of the data tracks at the outer diameter of the disc. As a result, the depth of curvature of the data tracks at the inner diameter is not equal to the depth of curvature of the data tracks at the outer diameter of the disc. Thus, the electrodes must be of a length that allows them to "fit" the depth of curvature of the data tracks at both the inner diameter, as well as at the outer diameter.

Figure 3:
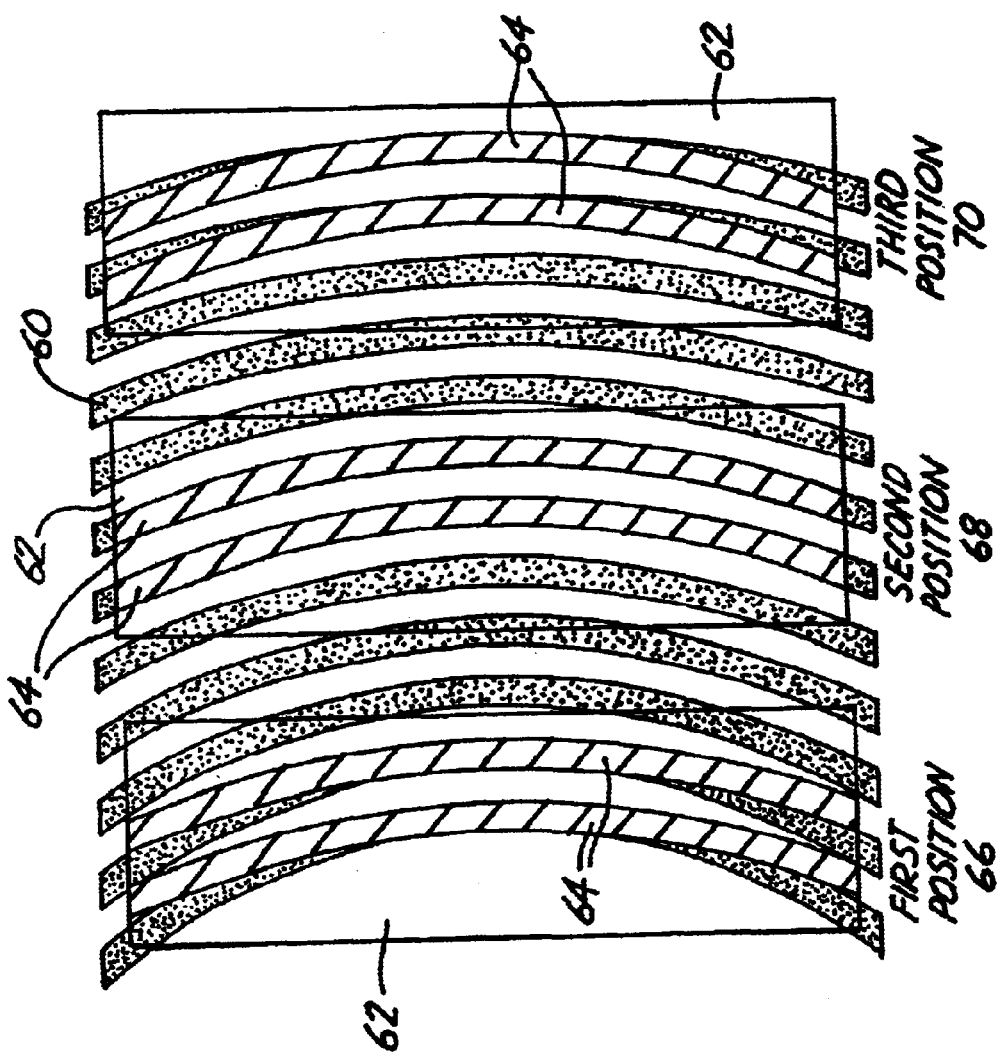
FIG. 3 shows a simplified diagrammatic view of a slider positioned at various locations on a disc.

To illustrate this, FIG. 3 shows a simplified diagrammatic view of a slider positioned at various locations on a disc. Shown in FIG. 3 are several data tracks 60 having varying depths of curvature corresponding to data tracks on a disc at the inner diameter moving toward the outer diameter. In addition, a slider 62 having two electrodes 64 is shown. At a first position 66, the slider 62 is positioned closest to the inner diameter. When so positioned, the electrodes 64 on the slider 62 do not match the data tracks 60. Similarly, at a third position 70, corresponding to an outer diameter of the disc, the electrodes 64 on the slider 62 likewise do not match the data tracks 60. The only time the electrodes 64 are exactly aligned with the data tracks 60 is when the slider 62 is located at a second position 68, located somewhere between the inner and outer diameter of the disc.

The longer the electrodes 64, the more difficult it is to ensure that the electrodes 64 properly align with the data tracks 60 at both the inner diameter and the outer diameter such that the electrodes 64 can efficiently be used to position the slider 62. As such, it is desired to have electrodes 64 with a length that will minimize the misalignment of the electrodes 64 and data tracks 60.

Figure 4:
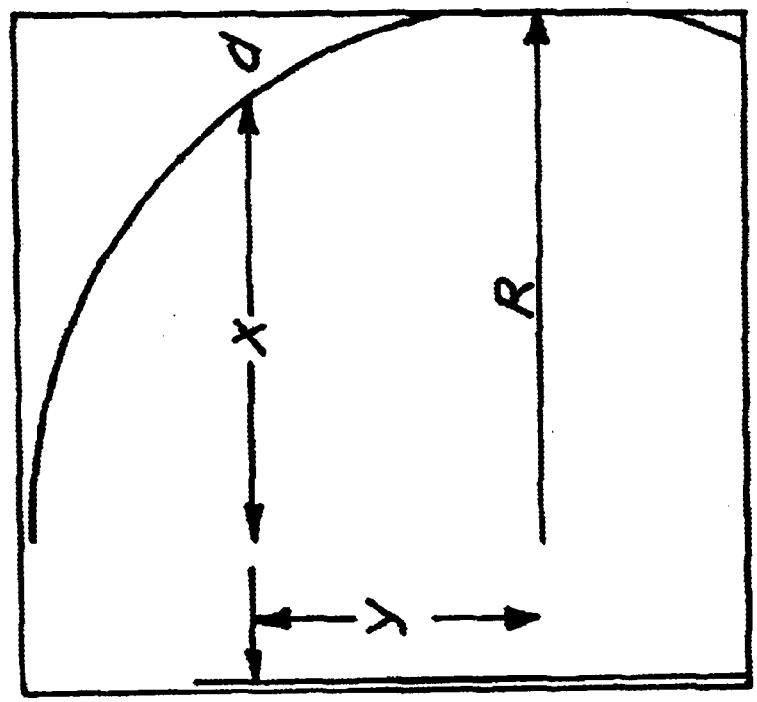
FIG. 4 is an illustration of the curvature depth of a curve.

FIG. 4 is an illustration of curvature depth of a circle. For a circle defined by $r^2 = x^2 + y^2$, the curvature depth d is a function of the radius r and the distance y from the radius. This relationship is given by the following equation:

$$d = r - \sqrt{(r^2 - y^2)}$$

FIG. 5 is a table 80 illustrating the amount of track curvature, and the difference in that curvature with respect to a radius of 28 millimeters, for various radii from 16 to 44 mm. Each cell of the table 80 contains two numbers. The upper number is the curvature, and the lower number is the change in curvature between that radius and the 28 millimeter radius. The far left column of the table 80 represents the orthogonal offsets from the radius line of between 0.000 and 0.100 mm. This offset in the y axis corresponds to the length of the electrodes on the slider.

As illustrated in FIG. 3 above, as the change in curvature with respect to the 28 mm radius increases, the misalignment between the slider electrodes and the data tracks will increase. Thus, the maximum tolerable y value is limited by the change in curvature with respect to the 28 mm radius. Because the curvature is symmetric about the radius line, the electrode length can be twice the maximum tolerable y value in the table 80.

The misalignment typically occurs at the ends of the slider electrodes. For the 500,000 TPI example illustrated above, if the misalignment between the ends of the electrodes and the data tracks exceeds 1 microinch, that portion of the electrode will be attracted more strongly to the adjacent track than the correct track, and the net positioning force will be reduced. However, the curvature mismatch at the ends of the slider electrodes will cause an offset in the opposite direction at the center, so the actual amount of curvature mismatch before the ends of the slider electrodes provide a negative contribution to the positioning force will be greater than 1 microinch but less than 2 microinches.

In light of this effect, the numbers in the table illustrated in FIG. 5 can assist in determining suitable lengths of electrodes. The numbers in area 82 indicate a positive contribution to positioning force for the entire length of the electrodes. The numbers in area 84 indicate a possible negative contribution from part of the length of the electrodes. Finally, the numbers in area 86 indicate a definite negative contribution from part of the electrode length. Thus, as can be determined from table 80 in FIG. 5, for a minimum track radius of 20 millimeters and a maximus radius of 44 millimeters, with the slider electrodes centered about the radius line, the length of the slider electrodes for maximum force is between 0.12 millimeters and 0.16 millimeters (2×0.060 and 2×0.080 mm).

To help maintain proper alignment of the slider electrodes to the tracks on the disc as the slider moves from the inner diameter to the outer diameter of the disc, it is necessary to utilize a suspension mechanism which maintains a fixed, rather than a rotating orientation of the slider to the disc.

Currently, the slider is moved over the disc using a VCM with a central pivot bearing, such as that illustrated in FIG. 1 above. Using a VCM results in an arc shaped path as the slider moves over the disc, rather than a linear shaped path. One method of obtaining the required linear path of the slider over the disc is to utilize linear actuation mechanisms.

One suitable linear actuation mechanism involves adding compliant springs between the slider and the slider suspension, similar to springs used in connection with other head level microactuators. A VCM or other primary positioning mechanism can still be used for coarse positioning and seeking to within some relatively small distance of the desired track. Once the primary positioning mechanism has positioned the slider to within about a half of a track of the desired position, the electrostatic motor can be actuated by activating the proper slider electrodes. The compliant springs will allow the slider to lock in and follow the desired track. Using the electrostatic motor allows for fine positioning, with no additional servo feedback required. In addition, if initial positioning error results in the slider being off by one or more tracks, the electrostatic positioning can also be used to step to the desired track.

A second method of linear actuation, though similar to the first, reduces the mass that must be moved by the electrostatic actuation. Reducing the moving mass greatly reduces the seek time of the electrostatic motor. Placing the compliant springs between slider and the slider suspension, as in method 1, requires moving the entire slider. In contrast, the second method involves placing compliant springs between the head and the slider. To do so, the compliant springs may be fabricated during the slider and transducing head manufacturing process. When the compliant springs are located between the head and the slider, only the head (and a thin substrate and overcoat encapsulating the head) must be actuated using the electrostatic motor. As a result, the moving mass is greatly reduced, and the electrostatic positioning acceleration is increased by 10 to 100 times.

A third method of linear actuation requires eliminating the primary positioning system entirely. In its place, only the electrostatic actuation is used for both track following and the coarse positioning used during seeking. To provide the required alignment of the slider electrodes to the disc as the slider sweeps across the disc surface, a folded flexure suspension mechanism may be used. The folded flexure suspension mechanism will increase the mass that must be moved by the electrostatic motor. As a result, seek times will be longer. Due to the longer seek times, this method may be better suited to low cost applications where speed is not the most important parameter.

Figure 6:
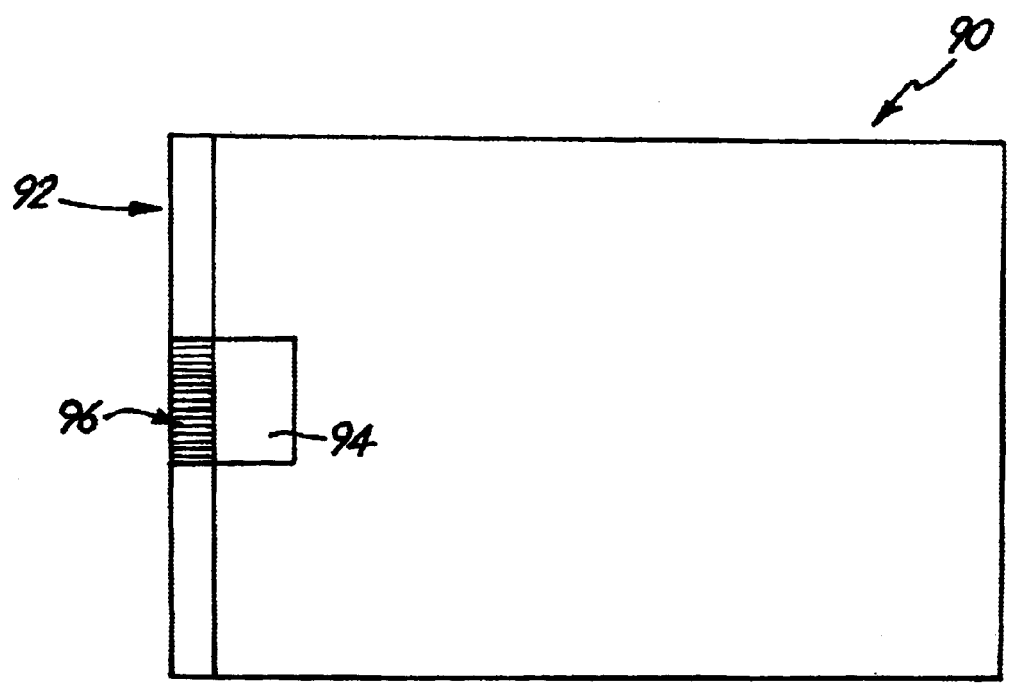
FIG. 6 is a bottom plan view of a slider illustrating the air bearing surface.

In addition to the length of the electrodes, the number of the slider electrodes located on the slider will have an effect on the performance of the electrostatic motor. FIG. 6 is a simplified bottom plan view of a slider illustrating the medium opposing surface of a slider 90. The slider 90 has a trailing edge 92 and an air bearing surface (ABS) 94. Located on the ABS are the electrodes, indicated generally by 96. The number of slider electrodes 96 is determined by the TPI and the width of the trailing edge air bearing surface 94.

A slider may have an ABS width of about 110 micrometers. The entire width of a slider may be 1 millimeter, in which case the ABS amounts to about one tenth of the total slider width. Based on a slider having these parameters, the number of electrodes which can be located on the ABS is approximately 541: (100 $\mu$m)(500 tracks/microinch)/(25.4 $\mu$m/microinch)(¼ active electrodes per data track)=541.

If the entire width of the trailing edge of the slider, rather than just the width of the ABS, was used for the electrodes, the number of electrodes could be increased by about 9 times. However, any such attempt to place electrodes on the entire width of the slider would require a drastic redesign of the air bearing.

Tables 2a–2c and 3a–3c below provide a comparison of the results of modeling the performance of electrostatic slider positioning systems having: 1) electrodes across the trailing edge ABS; and 2) having electrodes across the entire trailing edge. Each table shows the lateral positioning force, $F_{lat}$, and normal attraction force, $F_n$, as well as the resulting lateral accelerations possible at selected voltages.

Tables 2a–2c illustrate the performance of an electrostatic slider positioning system with electrodes located across the trailing edge ABS. The data in Tables 2a–2c is based on a slider having 541 active slider electrodes covering a width of about 110 microns, which is typical of the width of a trailing edge airbearing surface. In addition, the length of the electrodes was about $1.20 \times 10^{-4}$ meters, while the gap between the disc and the slider electrodes was about $2.50 \times 10^{-9}$ meters.

TABLE 2a

Femco Si Slider

| Volts | $F_{lat}$ (N) | $F_n$ (gram) | Acceleration (g) |
|---|---|---|---|
| 1 | 1.15E-04 | 0.12 | 19.6 |
| 1.5 | 2.59E-04 | 0.26 | 44.0 |
| 2 | 4.60E-04 | 0.47 | 78.2 |
| 2.5 | 7.19E-04 | 0.73 | 122.2 |
| 3 | 1.03E-03 | 1.06 | 176.0 |
| 5 | 2.87E-03 | 2.93 | 488.8 |
| 7 | 5.63E-03 | 5.75 | 958.0 |
| 10 | 1.15E-02 | 11.73 | 58653.2 |

TABLE 2b

Pico AlTiC Slider

| V | $F_{lat}$ (N) | $F_n$ (gram) | Acceleration (g) |
|---|---|---|---|
| 1 | 1.15E-04 | 0.12 | 7.3 |
| 1.5 | 2.59E-04 | 0.26 | 16.5 |
| 2 | 4.60E-04 | 0.47 | 29.3 |
| 2.5 | 7.19E-04 | 0.73 | 45.8 |
| 3 | 1.03E-03 | 1.06 | 66.0 |
| 5 | 2.87E-03 | 2.93 | 183.3 |
| 7 | 5.63E-03 | 5.75 | 359.3 |
| 10 | 1.15E-02 | 11.73 | 733.2 |

Table 2a provides the acceleration in g's for a Femco Si slider having a mass of $6 \times 10^{-7}$ kilograms. Table 2b provides the acceleration in g's for a Pico AlTiC slider having a mass of $1.6 \times 10^{-6}$ kilograms. Looking at Tables 2a and 2b, a 1 gram normal force ($F_n$) imposes a 3 volt limit on the electrode voltage, which generates 1.0 mN of positioning force ($F_{lat}$). As shown in Table 2a, moving the entire slider would provide an acceleration of 176 g's for a 0.6 mg Femco Silicon slider. As shown in Table 2b, an acceleration of 66 g's can be achieved for a 1.6 mg AlTic Pico slider.

An acceleration of 176 g's is near the maximum anticipated acceleration for seeking in high performance drives. In comparison, an acceleration pf 66 g's is rather modest performance which would have limited applications in high performance drives. If a simple air bearing design change allowed operation of the electrodes at 5 volts, the resulting normal attractive force of 2.9 grams, and a lateral force of about 219 mN, the Femco Silicon slider would have an acceleration of 488 g's and the AlTiC Pico slider would have an acceleration of about 183 g's. Both such performances would be suitable for high performance drives.

Table 2c shows the accelerations in g's for four head level actuators, such as by using compliant springs between the slider and head as described above. Table 2c shows the results of modeling four actuators each having a different moving mass. As can be seen in Table 2c, the head level actuators achieve high seek acceleration even at one volt electrode potential.

For a 30 microgram moving mass and a one volt potential, the resulting acceleration is 390 g's. This acceleration allows for a single track switch (for a disc having 500,000 TPI) in about 11 microseconds, neglecting settling time. With springs that allow one micrometer of motion, up to 20 tracks could be covered in 50 microseconds. With springs that allow five micrometers of travel, up to 100 tracks could be covered in 110 microseconds. At two volts, these times are reduced by a factor of two.

TABLE 2c

Transducer Level Actuators

| V | $F_{lat}$ (N) | $F_n$ (gram) | 2E-08 kg moving mass Accel. (g) | 3E-08 kg moving mass Accel. (g) | 5E-08 kg moving mass Accel. (g) | 1E-07 kg moving mass Accel. (g) |
|---|---|---|---|---|---|---|
| 1 | 1.15E-04 | 0.12 | 586.5 | 391.0 | 234.6 | 117.3 |
| 1.5 | 2.59E-04 | 0.26 | 1319.7 | 879.8 | 527.9 | 263.9 |
| 2 | 4.60E-04 | 0.47 | 2346.1 | 1564.1 | 938.5 | 469.2 |
| 2.5 | 7.19E-04 | 0.73 | 3665.8 | 2443.9 | 1466.3 | 733.2 |
| 3 | 1.03E-03 | 1.06 | 5278.8 | 3519.2 | 2111.5 | 1055.8 |
| 5 | 2.87E-03 | 2.93 | 14663.3 | 9775.5 | 5865.3 | 2932.7 |
| 7 | 5.63E-03 | 5.75 | 28740.1 | 19160.1 | 11496.0 | 5748.0 |
| 10 | 1.15E-02 | 11.73 | 58653.2 | 39102.2 | 23461.3 | 11730.6 |

Tables 3a–3c illustrate the results of modeling the performance of an electrostatic slider positioning system having electrodes located across the entire trailing edge of the slider. Shown in Tables 3a–3c are the lateral positioning force ($F_{lat}$) and normal attraction force ($F_n$), and the resulting lateral acceleration possible for various cases of moving mass at voltages from 0.5 to 5 volts. The data in Tables 3a–3c is based on a slider having 4920 active slider electrodes covering the entire width of the slider, or about 1000 microns. The length of the electrodes was about $1.20 \times 10^{-4}$ meters, while the gap between the disc and the slider electrodes was about $2.50 \times 10^{-9}$ meters.

The system illustrated in Tables 3a-3c requires a substantially redesigned trailing edge airbearing that also covers the entire width of the slider at the trailing edge. This embodiment, used with a primary positioning means for coarse track seeking and compliant springs between the slider and the suspension for electrostatic microactuation, provides higher performance than the embodiment illustrated in Tables 2a-2c.

TABLE 3a

Femco Silicon Slider

| V | $F_{lat}$ (N) | $F_n$ (gram) | Acceleration (g) |
|---|---|---|---|
| 0.5 | 2.61E-04 | 0.27 | 44.5 |
| 0.7 | 5.12E-04 | 0.52 | 87.1 |

TABLE 3a-continued

Femco Silicon Slider

| V | $F_{lat}$ (N) | $F_n$ (gram) | Acceleration (g) |
|---|---|---|---|
| 1 | 1.05E-03 | 1.07 | 177.8 |
| 1.5 | 2.35E-03 | 2.40 | 400.1 |
| 2 | 4.18E-03 | 4.27 | 711.2 |
| 2.5 | 6.53E-03 | 6.66 | 1111.3 |
| 3 | 9.41E-03 | 9.60 | 1600.2 |
| 5 | 2.61E-02 | 26.66 | 4445.1 |

TABLE 3b

Pico AlTic Slider

| V | $F_{lat}$ (N) | $F_n$ (gram) | Acceleration (g) |
|---|---|---|---|
| 0.5 | 2.61E-04 | 0.27 | 16.7 |
| 0.7 | 5.12E-04 | 0.52 | 32.7 |
| 1 | 1.05E-03 | 1.07 | 66.7 |
| 1.5 | 2.35E-03 | 2.40 | 150.0 |
| 2 | 4.18E-03 | 4.27 | 266.7 |
| 2.5 | 6.53E-03 | 6.66 | 416.7 |
| 3 | 9.41E-03 | 9.60 | 600.1 |
| 5 | 2.61E-02 | 26.66 | 1666.9 |

Table 3a provides the acceleration in g's for a Femco Si slider having a mass of $6 \times 10^{-7}$ kilograms. Table 3b provides the acceleration in g's for a Pico AlTic Slider having a mass of $1.6 \times 10^{-6}$ kilograms. The tables illustrate that acceptable performance for high performance drives is obtained at as low as 1.5 volts for the heavier Pico AlTiC slider and 1.0 volts for the Femco silicon slider.

As can be seen by comparing Tables 3a and 3b with Tables 2a and 2b, the wider trailing edge air bearing associated with Tables 3a and 3b allows greater normal force, possibly up to ten times greater, than the normal forces provided by the similar sliders illustrated in Tables 2a–2b. In addition, as shown in Tables 3a and 3b, at a voltage of three volts the acceleration of the Femco Silicon slider is 1600 g's and the acceleration of the Pico AlTiC slider is 600 g's. Both of these accelerations are significantly greater than the accelerations of 176 g's and 66 g's achieved by the Femco Silicon slider of Table 2a and the Pico AlTiC slider of Table 2b at the same voltage.

Table 3c below illustrates that for a lower performance, low cost drive, the primary positioning means can be entirely replaced by a simple folded flexure suspension that allows the slider to sweep the entire inner diameter to outer diameter range of the disc using only the electrostatic stepping action of the slider electrodes and the disc tracks. Though larger mass, the need for a primary positioning means is eliminated.

TABLE 3c

Slider with Folded Flexure Suspension

| V | $F_{lat}$ (N) | $F_n$ (gram) | 5E-06 kg moving mass Accel. (g) | 1E-05 kg moving mass Accel. (g) | 2E-05 kg moving mass Accel. (g) | 4E-05 kg moving mass Accel. (g) |
|---|---|---|---|---|---|---|
| 0.5 | 2.61E-04 | 0.27 | 5.3 | 2.7 | 1.3 | 0.7 |
| 0.7 | 5.12E-04 | 0.52 | 10.5 | 5.2 | 2.6 | 1.3 |
| 1 | 1.05E-03 | 1.07 | 21.3 | 10.7 | 5.3 | 2.7 |
| 1.5 | 2.35E-03 | 2.40 | 48.0 | 24.0 | 12.0 | 6.0 |
| 2 | 4.18E-03 | 4.27 | 85.3 | 42.7 | 21.3 | 10.7 |
| 2.5 | 6.53E-03 | 6.66 | 133.4 | 66.7 | 33.3 | 16.7 |
| 3 | 9.41E-03 | 9.60 | 192.0 | 96.0 | 48.0 | 24.0 |
| 5 | 2.61E-02 | 26.66 | 533.4 | 266.7 | 133.4 | 66.7 |

Although the present invention has been described with reference to preferred embodiments, workers skilled in the art will recognize that changes may be made in form and detail without departing from the spirit and scope of the invention.

What is claimed is:

1. A transducing head positioning system, the system comprising:
    a first portion of an electrostatic motor comprising patterned data storage media having a plurality of data tracks; and
    a second portion of the electrostatic motor formed on a slider, wherein the electrostatic motor is used to position a transducing head above a selected data track on the patterned storage media.

2. The transducing head positioning system of claim 1 wherein the plurality of data tracks comprises concentric data tracks.

3. The transducing head positioning system of claim 2 wherein each concentric data track comprises a raised track and a groove.

4. The transducing head positioning system of claim 3 wherein a pitch of each data track is about 2 microinches.

5. The transducing head positioning system of claim 3 wherein the second portion of the electrostatic motor comprises a plurality of electrodes located on a media opposing surface of the slider.

6. The transducing head positioning system of claim 5 wherein a width of the electrodes is about equal to a width of the raised tracks on the patterned storage media.

7. The transducing head positioning system of claim 6 wherein a ratio of the electrodes on the slider to the data track spacing on the patterned storage media is 4 data tracks to 3 electrodes.

8. The transducing head positioning system of claim 7 and further comprising a linear actuator for positioning the slider.

9. The transducing head positioning system of claim 5 wherein the plurality of electrodes further comprises:
    a plurality of phase one electrodes;
    a plurality of phase two electrodes; and
    a plurality of phase three electrodes.

10. An electrostatic slider positioning system, the system comprising:
    patterned media comprising a plurality of data tracks; and
    a slider located proximate the patterned media, wherein the slider includes a plurality of electrodes configured to be selectively activated to cause an electrostatic attraction between an electrode and a data track, and position the slider at a selected data track.

11. The electrostatic slider positioning system of claim 10 wherein each data track comprises a track and a groove.

12. The electrostatic slider positioning system of claim 11 wherein the plurality of electrodes on the slider and the plurality of data tracks on the patterned media form an electrostatic motor.

13. The electrostatic slider positioning system of claim 12 wherein a width of each electrode is about the same as a width of a track on the disc.

14. The electrostatic slider positioning system of claim 13 wherein a ratio of the spacing of the electrodes on the slider to the spacing of the data tracks on the patterned storage media is 4 data tracks to 3 electrodes.

15. The electrostatic slider positioning system of claim 13 wherein the electrodes have a length which allows the electrodes follow a curvature of data tracks at both an inner and an outer diameter of the disc.

16. The electrostatic slider positioning system of claim 15 and further comprising means for linear actuation of the slider as it tracks over the surface of the disc.

17. The electrostatic slider positioning system of claim 12 wherein the plurality of electrodes on the slider comprises:
    a first phase electrode;
    a second phase electrode; and
    a third phase electrode.

18. The electrostatic slider positioning system of claim 17 and further comprising a control system for controlling the electrostatic motor by selectively applying a voltage to the first, second, and third phase electrodes.

19. A method of controlling the position of a transducing head above the surface of a patterned electronic storage medium, the method comprising:
    suspending a slider above a surface of the storage medium, wherein the slider comprises a plurality of electrodes on a storage medium opposing surface; and moving the transducing head to a desired data track on the storage medium by actuating an electrostatic motor formed by the plurality of electrodes on the slider and tracks on the patterned electronic storage medium.

20. The method of claim 19 and further comprising coarsely positioning the slider using a linear actuator.

21. The method of claim 19 wherein actuating the electrostatic motor comprises applying a voltage to an electrode of the electrostatic motor to create an electrostatic attraction between the electrode and a track on the medium.

22. The method of claim 21 wherein actuating the electrostatic motor further comprises applying a voltage to selected electrodes.

23. The method of claim 22 wherein applying a voltage to selected electrodes comprises:
configuring the plurality of electrodes to comprise a first phase electrode, a second phase electrode, and a third phase electrodes; and
controlling the application of a voltage to the first, second, and third phase electrodes to move the slider across the storage medium.

24. A transducing head positioning system, the system comprising:
patterned data storage media comprising a plurality of data tracks, wherein each data track comprises a raised track and a groove, the patterned data storage media forming a first portion of an electrostatic motor; and
a slider carrying a second portion of the electrostatic motor, wherein the second portion of the electrostatic motor comprises a plurality of electrodes located on a media opposing surface of the slider, wherein a width of the electrodes is about equal to a width of the raised tracks on the patterned storage media, and wherein the electrostatic motor is used to position a transducing head above a selected data track on the patterned storage media.

25. The transducing head positioning system of claim 24 wherein a ratio of the electrodes on the slider to the data track spacing on the patterned storage media is 4 data tracks to 3 electrodes.

26. The transducing head positioning system of claim 25 and further comprising a linear actuator for positioning the slider.

27. An electrostatic transducer positioning system, the system comprising:
patterned media comprising a plurality of data tracks, wherein each data track comprises a track and a groove; and
a transducer located proximate the patterned media, wherein the transducer comprises a plurality of electrodes which form an electrostatic motor together with the plurality of data tracks, the plurality of electrodes comprising a first phase electrode, a second phase electrode, and a third phase electrode which can be selectively activated to cause an electrostatic attraction between an electrode and a data track.

28. The electrostatic transducer positioning system of claim 27 and further comprising a control system for controlling the electrostatic motor by selectively applying a voltage to the first, second, and third phase electrodes.

29. A method of controlling the position of a transducer above patterned media, the method comprising:
suspending a transducer above a surface of the media, wherein the transducer includes a plurality of electrodes on a media opposing surface; and
moving the transducer to a desired data track on the media by applying a voltage to at least one of the plurality of electrodes to create an electrostatic attraction between the electrode and a data track on the media.

30. The method of claim 29 wherein moving the transducer further comprises:
selecting three of the plurality of electrodes; and
applying a voltage to one of the three selected electrodes.

31. The method of claim 29 wherein applying a voltage to at least one of the plurality of electrodes comprises:
configuring the plurality of electrodes to comprise a first phase electrode, a second phase electrode, and a third phase electrode; and
controlling the application of a voltage to the first, second, and third phase electrodes to move the transducer across the media.

* * * * *